Patented June 24, 1930

1,767,285

UNITED STATES PATENT OFFICE

HENRY HAROLD HIGBIE, OF ANN ARBOR, MICHIGAN

REFLECTING MATERIAL

No Drawing.  Application filed July 28, 1928. Serial No. 296,105.

This invention relates to light reflecting material for use wherever surfaces of high reflecting power are desirable.

As is well known, the best commercial white paints, enamels and papers have only a fair reflecting power, being capable of reflecting only about 75 to 80% of the visible light. On the other hand, certain substances, such as magnesium carbonate or oxide, have extremely high light reflecting power, from 95 to 99%, but these substances are not adapted for use in paints. Furthermore, those pigments, such as lead and zinc oxides, which are commonly used in paints, have themselves considerably higher reflecting powers than the paints made from them.

It is therefore an object of this invention to make possible the use of exceedingly highly reflective material not ordinarily available for the purpose in a state in which its full reflective power can be realized.

It is a further important object of this invention to provide a highly reflective material having a transparent or translucent, non-porous covering medium to prevent deterioration of the material itself due to accumulation thereon of dirt and the like.

Other and further important objects of this invention will become apparent from the following description and appended claims.

Many substances, such as magnesium carbonate, magnesium oxide, lead oxide, zinc oxide and titanium oxide have high reflective powers but when incorporated into paint vehicles lose such reflective capacity to a very considerable extent. It is, for instance, established that magnesium carbonate is able to reflect as much as 97 to 99% of whatever light falls upon it, provided, apparently, that the magnesium carbonate particles are surrounded by air. But when the same substance is immersed in a paint vehicle and spread as an adherent coating upon a surface, this reflecting ability largely disappears and the paint lacks "covering" power.

If, then, the light reflecting particles be completely surrounded and covered with material which cements them strongly together and to the surface that backs them, their ability to reflect light and hide the surface is seriously decreased. On the other hand, if the particles be not so surrounded and cemented, they are not only likely to absorb and hold foreign material that will impair their reflecting value, but they are liable to become detached from the covered surface, owing to the flaky, non-coherent nature of the reflective material itself.

Consequently, according to my present invention, the reflecting particles having high light reflecting ability are protected from exposure to the dirt and dust of the atmosphere by means of a transparent or translucent covering or confining medium, in film or sheet form, as thin, tough, flexible and non-porous as possible, the contact between the reflecting particles and the protective medium being such as not to impair the reflecting ability of the former. It is not necessary that the protective medium be transparent so long as it is translucent, that is, capable of transmitting light with least possible loss. A translucent medium of low absorption is satisfactory.

In one embodiment of my invention, the transparent or translucent protective medium employed may be formed of cellulose ester sheet material, such as nitro-cellulose, celluloid, cellulose acetate, pyroxylin or the like, cellophane or a gelatin composition sheet. The highly light reflective material is spread upon a suitable backing, or another sheet of translucent material, and a protective covering medium secured thereon in such a manner as to hold the particles in place.

The protective coverings may be formed of cellophane, cemented or sewed together at frequent intervals by lines of stitching. In a similar manner, glass may be used as the protective coating, preferably a thin glass.

In another embodiment of my invention, the light reflecting particles, such as magnesium carbonate, are introduced into hollow filaments or threads of cellulosic material. Such threads or filaments are then woven into a fabric for use in the covering of walls, ceilings and the like, or for lamp shade linings. Such fabrics, because of their very high light-reflecting value are much more desirable for lamp shades than ordinary silk or artificial silk fabrics and as lining material for reflectors reflect more light than the ordinary bare surfaces of such reflectors.

In still another embodiment of my invention, the magnesium carbonate, magnesium oxide, titanium oxide or other finely divided material of high light reflecting ability are thoroughly mixed with a liquid plastic substance or a solution of a plastic substance from which transparent sheets are ordinarily formed, in such a manner that when solidified or dried the sheets will have higher reflecting power than any painted surface.

Instead of incorporating the particles of high reflecting power into the body of the plastic, the surface of the translucent sheets in a state of forming may be dusted with the particles. In using coated sheets of this character the smooth or uncoated surface would be the one exposed, since it would collect less dust and could be more easily cleaned.

In any of the above described forms of my invention, the translucent film, sheet or plate may be colored to provide an infinite variety of "artistic" effects. Or suitably colored pigments might be mixed in the desired proportions with the particles of high reflecting power.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A light reflecting material, which comprises pulverulent magnesium carbonate the particles being surrounded by air and a translucent flexible film enclosing the same.

2. A light reflecting material, which comprises a base having a layer of pulverulent magnesium carbonate thereon and a translucent overlying sheet secured to the said base adapted to retain said layer of magnesium carbonate and protect it from exposure to the atmosphere.

In testimony whereof I have hereunto subscribed my name at Ann Arbor, Washtenaw County, Michigan.

H. HAROLD HIGBIE.